(12) United States Patent  (10) Patent No.: US 7,984,370 B2
Sugahara                                      (45) Date of Patent:   Jul. 19, 2011

(54) METHOD OF PROCESSING PLURALITY OF IMAGES ARRANGED IN CHRONOLOGICAL ORDER

(75) Inventor: Yoshinori Sugahara, Kyoto (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1098 days.

(21) Appl. No.: 11/803,970

(22) Filed: May 16, 2007

(65) Prior Publication Data
US 2007/0269090 A1   Nov. 22, 2007

(30) Foreign Application Priority Data

May 17, 2006 (JP) ................................. 2006-137944
Mar. 19, 2007 (JP) ................................. 2007-070535

(51) Int. Cl.
G06F 17/00 (2006.01)
G06F 17/20 (2006.01)
G06F 17/22 (2006.01)
G06F 17/26 (2006.01)
G06F 17/27 (2006.01)
G06F 3/00 (2006.01)

(52) U.S. Cl. ........ 715/202; 715/211; 715/238; 715/249; 715/277; 715/726; 715/730

(58) Field of Classification Search .................. 715/202, 715/211, 238, 249, 277, 726, 730
See application file for complete search history.

(56) References Cited

U.S. PATENT DOCUMENTS

| | | | | |
|---|---|---|---|---|
| 5,696,843 A * | 12/1997 | Miyaza | .................. | 382/176 |
| 5,969,755 A | 10/1999 | Courtney | .................. | 348/143 |
| 6,049,363 A | 4/2000 | Courtney et al. | .................. | 348/700 |
| 6,721,444 B1 * | 4/2004 | Gu et al. | .................. | 382/154 |
| 6,857,102 B1 * | 2/2005 | Bickmore et al. | .................. | 715/205 |
| 6,933,527 B2 | 8/2005 | Isobe et al. | .................. | 257/59 |
| 7,532,738 B2 * | 5/2009 | Hashimoto et al. | .................. | 382/100 |
| 2001/0002215 A1 * | 5/2001 | Katsuyama | .................. | 382/171 |
| 2002/0054017 A1 * | 5/2002 | Agata et al. | .................. | 345/157 |
| 2002/0126913 A1 * | 9/2002 | Kotake et al. | .................. | 382/282 |
| 2002/0145747 A1 * | 10/2002 | Burquist et al. | .................. | 358/1.14 |
| 2003/0028537 A1 * | 2/2003 | Nakamura et al. | .................. | 707/10 |
| 2004/0247192 A1 * | 12/2004 | Kajiki et al. | .................. | 382/239 |
| 2006/0123343 A1 * | 6/2006 | Shimokawa | .................. | 715/712 |
| 2008/0069475 A1 * | 3/2008 | Ekstrand | .................. | 382/284 |
| 2010/0171846 A1 * | 7/2010 | Wood et al. | .................. | 348/231.99 |

OTHER PUBLICATIONS

Adobe® Systems Incorporated, "PDF® Reference fifth edition" (http://www.adobe.com/devnet/pdf/pdfs;PDFReference16.pdf), pgs. title p. 334-356, last page, Nov. 2004.
Adobe® Systems Incorporated, "Create layered PDF® documents" (http://www.adobe.com/designcenter/acrobat/articles/aarc7layer/html), 3 pgs., Dec. 19, 2004.

* cited by examiner

*Primary Examiner* — Doug Hutton
*Assistant Examiner* — Soumya Dasgupta
(74) *Attorney, Agent, or Firm* — Sidley Austin LLP

(57) ABSTRACT

A meeting data conversion application executed in a PC successively obtains the first and last images and an image immediately before reduction of display content, among a plurality of images arranged in chronological order. Among the obtained images, an image immediately before reduction of display content by a prescribed amount or more and the last image are registered as delimiting images. Among the obtained images, the images from the image immediately after the delimiting image to the next delimiting image are processed as one image group.

29 Claims, 14 Drawing Sheets

| IMAGE NUMBER | TIME STAMP | IMAGE FILE NAME | PICK UP FLAG | DELIMITING IMAGE FLAG |
|---|---|---|---|---|
| 1 | 00:00:00 | 000000.jpg | off | off |
| 2 | 00:00:20 | 000020.jpg | off | off |
| 3 | 00:00:40 | 000040.jpg | off | off |
| 4 | 00:01:00 | 000100.jpg | off | off |
| 5 | 00:01:20 | 000120.jpg | off | off |
| 6 | 00:01:40 | 000140.jpg | off | off |
| 7 | 00:02:00 | 000200.jpg | off | off |
| 8 | 00:02:20 | 000220.jpg | off | off |
| 9 | 00:02:40 | 000240.jpg | off | off |
| 10 | 00:03:00 | 000300.jpg | off | off |
| 11 | 00:03:20 | 000320.jpg | off | off |

FIG.15

| IMAGE NUMBER | TIME STAMP | IMAGE FILE NAME | PICK UP FLAG | DELIMITING IMAGE FLAG |
|---|---|---|---|---|
| 1 | 00:00:00 | 000000.jpg | on | off |
| 2 | 00:00:20 | 000020.jpg | off | off |
| 3 | 00:00:40 | 000040.jpg | on | off |
| 4 | 00:01:00 | 000100.jpg | off | off |
| 5 | 00:01:20 | 000120.jpg | on | on |
| 6 | 00:01:40 | 000140.jpg | off | off |
| 7 | 00:02:00 | 000200.jpg | off | off |
| 8 | 00:02:20 | 000220.jpg | off | off |
| 9 | 00:02:40 | 000240.jpg | on | off |
| 10 | 00:03:00 | 000300.jpg | off | off |
| 11 | 00:03:20 | 000320.jpg | on | off |

FIG.16

| IMAGE NUMBER | TIME STAMP | IMAGE FILE NAME | PICK UP FLAG | DELIMITING IMAGE FLAG |
|---|---|---|---|---|
| 1 | 00:00:00 | 000000.jpg | on | off |
| 2 | 00:00:20 | 000020.jpg | off | off |
| 3 | 00:00:40 | 000040.jpg | on | off |
| 4 | 00:01:00 | 000100.jpg | off | off |
| 5 | 00:01:20 | 000120.jpg | on | on |
| 6 | 00:01:40 | 000140.jpg | off | off |
| 7 | 00:02:00 | 000200.jpg | off | off |
| 8 | 00:02:20 | 000220.jpg | off | off |
| 9 | 00:02:40 | 000240.jpg | on | off |
| 10 | 00:03:00 | 000300.jpg | off | off |
| 11 | 00:03:20 | 000320.jpg | on | on |

FIG.18A

GROUP NUMBER 1

| IMAGE NUMBER |
|---|
| 1 |
| 3 |
| 5 |

FIG.18B

GROUP NUMBER 2

| IMAGE NUMBER |
|---|
| 9 |
| 11 |

METHOD OF PROCESSING PLURALITY OF IMAGES ARRANGED IN CHRONOLOGICAL ORDER

This application is based on Japanese Patent Applications Nos. 2006-137944 and 2007-070535 filed with the Japan Patent Office on May 17, 2006 and on Mar. 19, 2007, respectively, the entire content of which is hereby incorporated by reference.

BACKGROUND OF THE INVENTION

1. Field of the Invention

The present invention relates to an image processing method, a computer-readable recording medium having an image processing program stored therein, and an image processing apparatus, and more particularly to an image processing method of processing a plurality of images arranged in chronological order, a computer-readable recording medium having an image processing program stored therein, and an image processing apparatus.

2. Description of the Related Art

It has been proposed that an image having pixels varied greatly in a group of images such as moving images arranged in chronological order is displayed as a still image.

However, when the aforementioned conventional method is employed, the number of displayed still images increases, thereby complicating the use of information.

SUMMARY OF THE INVENTION

An object of the present invention is therefore to provide an image processing method allowing a plurality of images arranged in chronological order to be processed properly, a computer-readable recording medium having an image processing program stored therein, and an image processing apparatus.

In accordance with an aspect of the present invention, an image processing method of processing a plurality of images arranged in chronological order includes the steps of: identifying and specifying as an extracted image an image immediately before reduction of an amount of display content, among the plurality of images arranged in chronological order; and identifying and specifying as a delimiting image an image immediately before reduction of an amount of display content by at least a prescribed amount, among the plurality of images arranged in chronological order.

In accordance with another aspect of the present invention, a computer-readable recording medium having an image processing program recorded thereon has a program stored therein for processing a plurality of images arranged in chronological order. The program causes a computer to perform the following steps: identifying and specifying as an extracted image an image immediately before reduction of an amount of display content, among the plurality of images arranged in chronological order; and identifying and specifying as a delimiting image an image immediately before reduction of an amount of display content by at least a prescribed amount, among the plurality of images arranged in chronological order.

In accordance with a further aspect of the present invention, an image processing apparatus processing a plurality of images arranged in chronological order includes: a first specification section identifying and specifying as an extracted image an image immediately before reduction of an amount of display content, among the plurality of images arranged in chronological order; and a second specification section identifying and specifying as a delimiting image an image immediately before reduction of an amount of display content by at least a prescribed amount, among the plurality of images arranged in chronological order.

In accordance with the present invention, it becomes possible to provide an image processing method allowing a plurality of images arranged in chronological order to be processed properly, a computer-readable recording medium having an image processing program stored therein, and an image processing apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 shows a specific example of the image group management table when the process at step S103 is performed on the images in FIG. 5.

FIG. 16 shows a specific example of the image group management table when the process at step S105 is performed on the images in FIG. 5.

FIG. 18A and FIG. 18B each show a specific example of a group table.

DESCRIPTION OF THE PREFERRED EMBODIMENTS

First Embodiment

Figure 1:
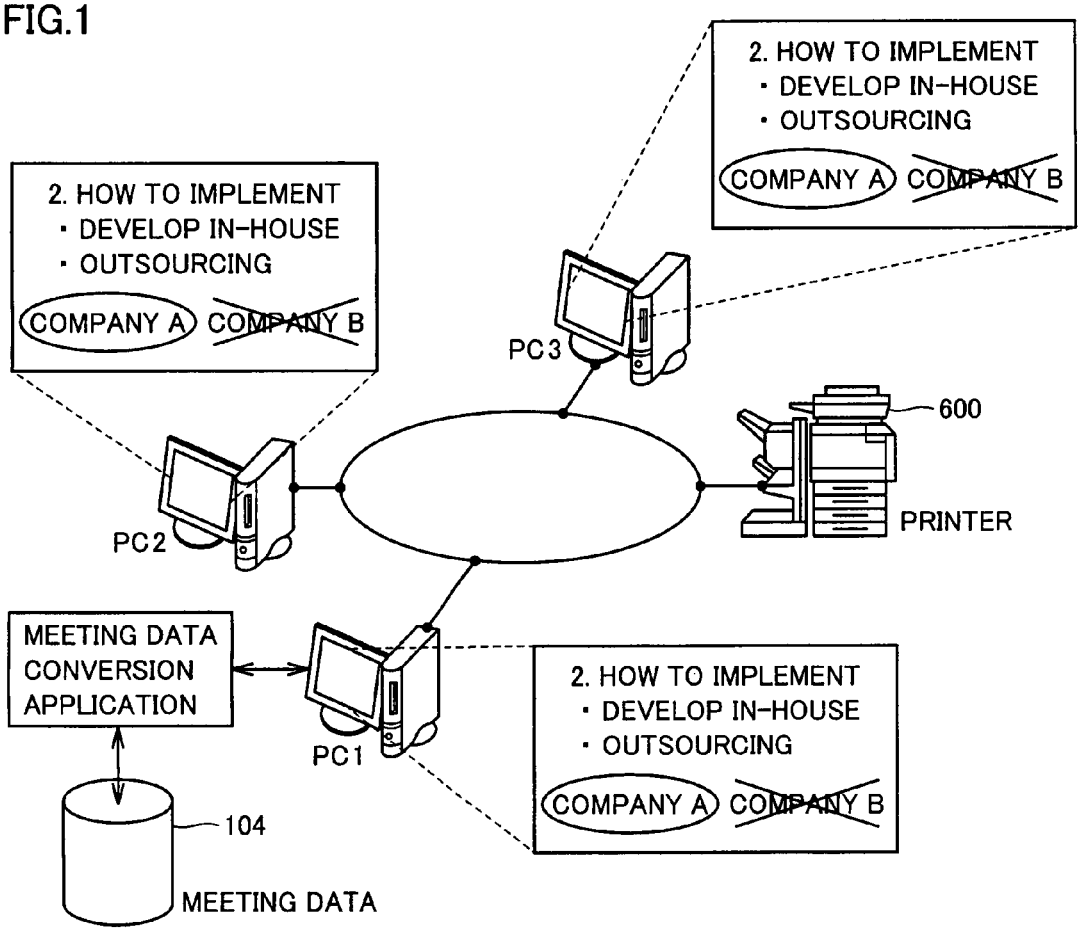
FIG. 1 shows a configuration of a meeting system including an image processing apparatus in a first embodiment of the present invention.

Referring to FIG. 1, a meeting system has a configuration in which a plurality of personal computers (PCs) 1-3 and an MFP (Multi Function Peripheral) 600 having a printer function are connected to each other. A common display image appears on each PC so that the user of each PC can write or delete images such as characters or graphics on the screen using an input device. Therefore, a meeting proceeds with one image shared among a plurality of PCs.

A meeting data conversion application is installed in PC 1. The application captures images repeatedly written or deleted by PCs 1-3 into a hard disk 104 as meeting data at certain time intervals. Accordingly, information arranged in chronological order is recorded as still images. The recorded still images are output by an apparatus outputting a still image, such as MFP 600, for example.

The meeting data conversion application takes out appropriate images in a time series and groups them together. This process allows a meeting record to be left with reduced lacking information and with reduced number of still images.

Figure 2:
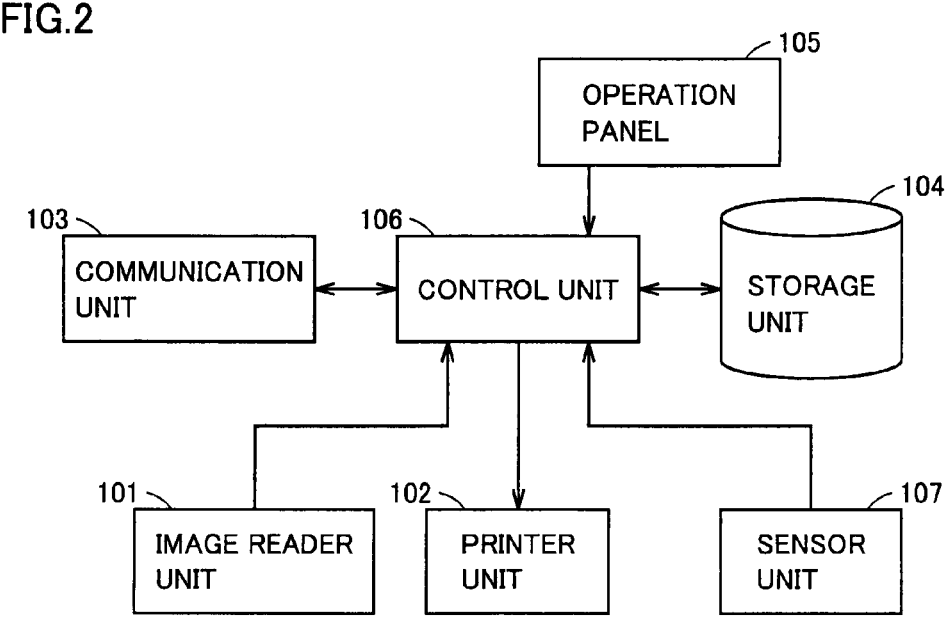
FIG. 2 is a block diagram showing a hardware configuration of an MFP 600 in FIG. 1.

Referring to FIG. 2, MFP 600 includes a control unit 106 controlling the entire apparatus, an image reader unit 101 reading image data from an original document, a printer unit 102 printing an image on a sheet of paper, a communication unit 103 for wireless communication in a close range or connecting a printing apparatus to a network or a telephone line, a storage unit 104 for storing job data and the like, an operation panel 105 as an interface with a user, and a sensor unit 107 detecting the remaining amount of consumables and the like.

Figure 3:
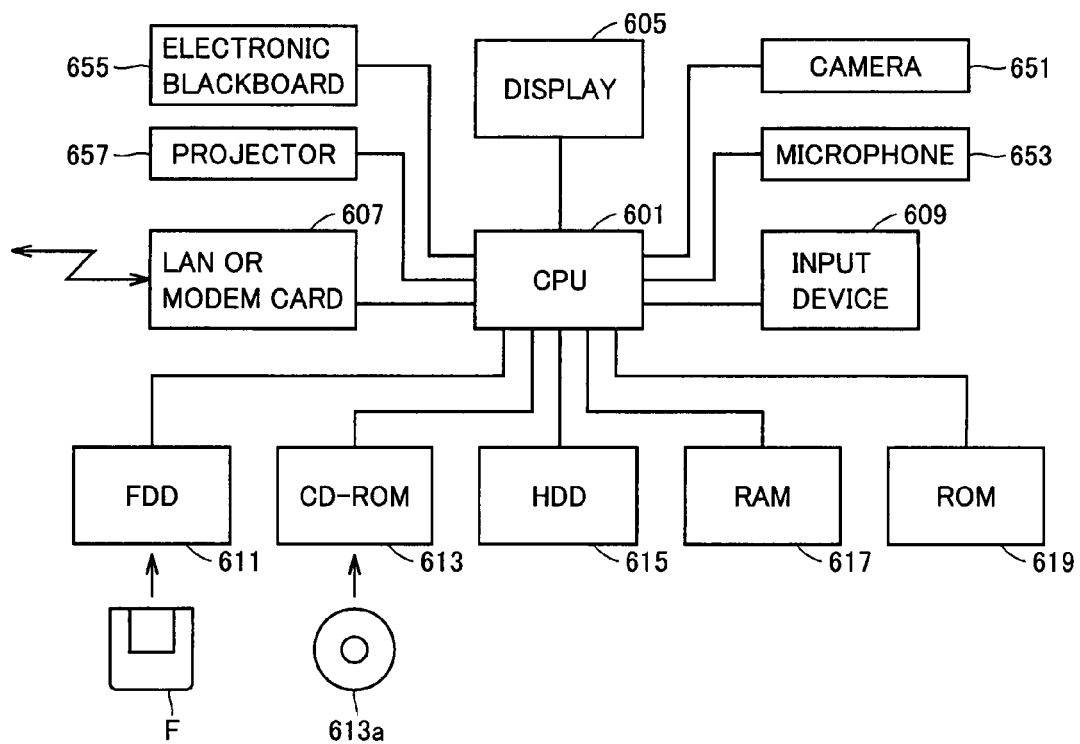
FIG. 3 is a block diagram showing a hardware configuration of one of PCs in FIG. 1.

Referring to FIG. 3, a PC included in the meeting system includes a CPU 601 for controlling the entire apparatus, a display 605, an LAN (Local Area Network) card 607 (or a modem card) for connection to a network or external communication, an input device 609 formed of a keyboard, a mouse and the like, a flexible disk drive 611, a CD-ROM drive 613, a hard disk drive 615, an RAM 617, and an ROM 619.

Connected to PC are a camera 651 for use in a meeting, a microphone 653 for inputting sounds, an electronic blackboard 655, and a projector 657 projecting an image on electronic blackboard 655 or a screen.

Flexible disk drive 611 allows data such as a program or an image recorded in a flexible disk F to be read. CD-ROM drive 613 allows data such as a program or an image recorded in a CD-ROM 613*a* to be read.

Here, a DVD drive, a memory card reader, or the like as an interface for inputting an image such as a photograph into the system may be provided. A hard disk drive is preferably used to accumulate images.

In addition, a video signal output terminal for a television may be provided to display an image such as a photograph. Furthermore, in order to facilitate an operation of the system, a remote controller may be provided. Moreover, an image management apparatus may be provided which is integrally formed of a display screen, a storage device, an image capture, a controller, and a remote control transmission/reception unit.

Figure 4:
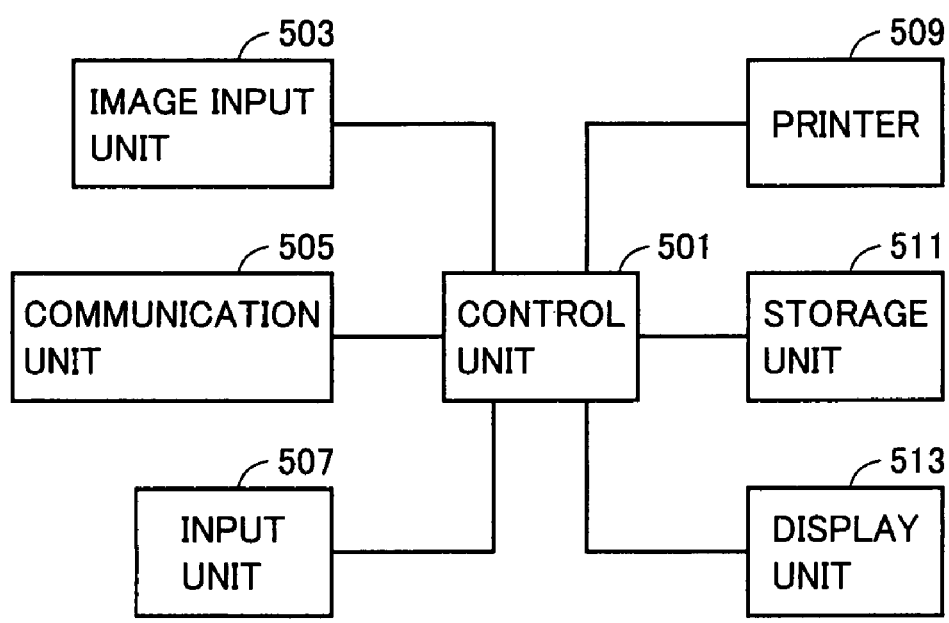
FIG. 4 is a block diagram showing a configuration of an electronic blackboard 655.

Referring to FIG. 4, electronic blackboard 655 includes a control unit 501 for controlling the entire apparatus, an image input unit 503 including a CCD for inputting an image written on a whiteboard with a pen, a communication unit 505 for data communications with external equipment, an input unit 507 formed of a button and the like for operations, a printer 509 printing an image on the whiteboard, a storage unit 511 storing image data and the like, and a display unit 513 formed of a liquid crystal display or the like.

In the present embodiment, images obtained in chronological order are stored in a storage device of PCs 1-3, MFP 600 or a server.

Figure 5:
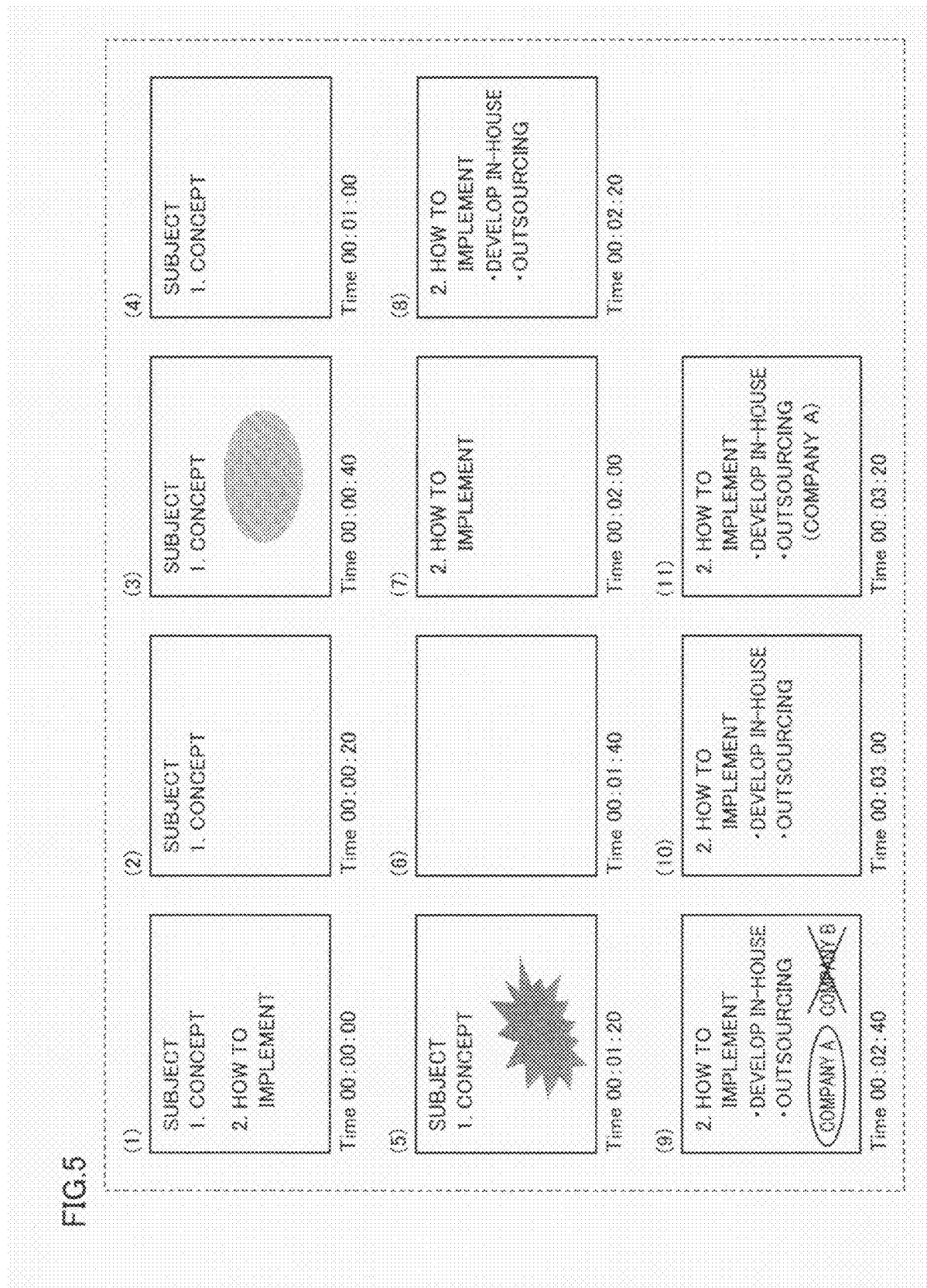
FIG. 5 shows an example of images obtained in the meeting system.

As a specific example, here, images displayed on PCs 1-3 or images displayed on electronic blackboard 655 are automatically saved every 20 seconds. FIG. 5 illustrates an image (1) at the start of a meeting to an image (11) upon a lapse of three minutes and twenty seconds. At the end of the meeting, as shown in FIG. 5, images are arranged in chronological order in meeting data.

The meeting data conversion application of the meeting system narrows down to (picks up) images immediately before reduction of the amount of display content, from the images captured at certain time intervals (here every 20 seconds), and registers those images. It is noted that "the amount of display content" refers to the amount of objects expressed in an image, specifically, including the number of pixels of colors other than a background color in the image, color variations of each pixel used in the image, the number of edges extracted from the image, and the like. In the following description, "the amount of display content" is the number of pixels of colors other than a background color in an image, and images immediately before reduction of the number of pixels are narrowed down and registered. The images narrowed down are expressed as being grouped together, with delimitation according to the timing at which a prescribed amount of pixels is reduced.

More specifically, the meeting data conversion application reads images in order from the earlier Time Stamp and picks up an image immediately before reduction of the used pixels. In FIG. 5, Time Stamps are allotted to the images in order from (1) to (11). For example, in a comparison between image (3) with Time 00:00:40 and image (4) with Time 00:01:00, image (4) does not have a pattern included in image (3) at the middle unit and has the pixels in use reduced. Then, image (3) with Time 00:00:40 is picked up as an image immediately before reduction of pixels.

On the other hand, in a comparison between image (4) with Time 00:01:00 and image (5) with Time 00:01:20, image (4) is not picked up since the pixels increase.

When the pixels in use are reduced by a prescribed amount or more, the meeting data conversion application specifies the image immediately before that as a delimiting image, during pick-up. It is noted that "reduction by a prescribed amount or more" includes a case where pixels become equal to or less than a prescribed amount and a case where pixels are reduced by a prescribed amount or more or by a prescribed percentage or more as compared with the pixels used in the immediately preceding image. The former case can be determined, specifically, when an image entirely disappears, or when an image is reduced to such an extent that the image cannot be identified by a human being in a medium on which the image is displayed. On the other hand, the latter case can be determined, specifically, when an image is reduced by half or more, or when a rectangular region including an image is reduced by half or more. In the following description, during pick-up, it is determined that pixels in use become equal to or less than a prescribed amount (here, a pixel count 0), and the image immediately before that is assumed as a delimiting image.

Here, the last image (11) in the image group is exceptionally picked up and set as the last delimiting image. The first image (1) is also picked up.

Figure 6:
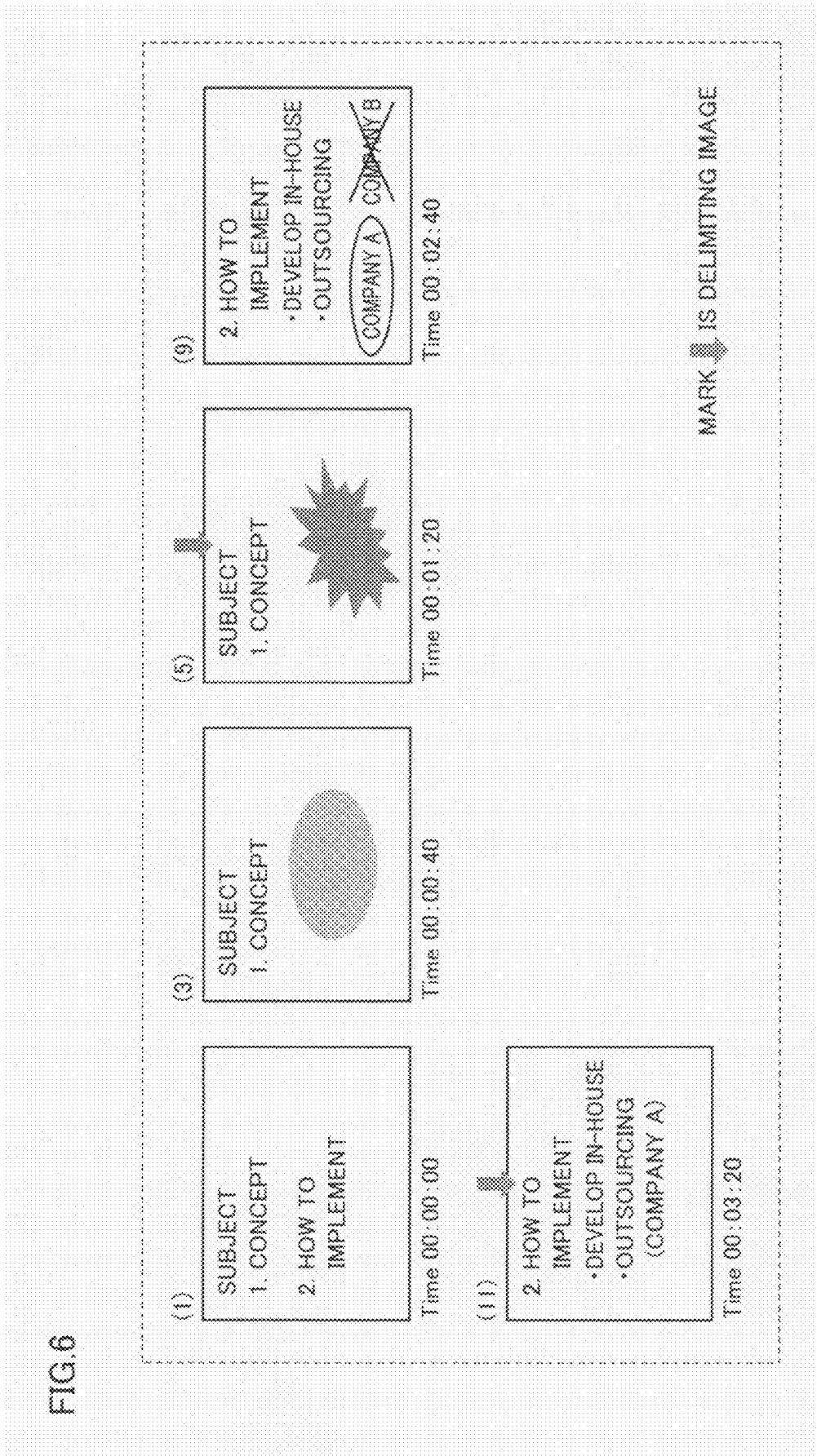
FIG. 6 shows a result of processing the images in FIG. 5.

FIG. 6 shows the result of processing the images in FIG. 5.

Here, among the images in FIG. 5, the first image (1), images (3), (5) and (9) which are images immediately before reduction of pixels, as well as the last image (11) are picked up.

Furthermore, in FIG. 6, a delimiting image is indicated by an arrow mark. Image (5) is set as a delimiting image since it is an image immediately before the pixels in use become equal to or less than a prescribed amount (here, a pixel count 0), as shown in (5), (6) in FIG. 5. Image (11) is set as the last delimiting image since it is the last image in the image group.

Figure 7:
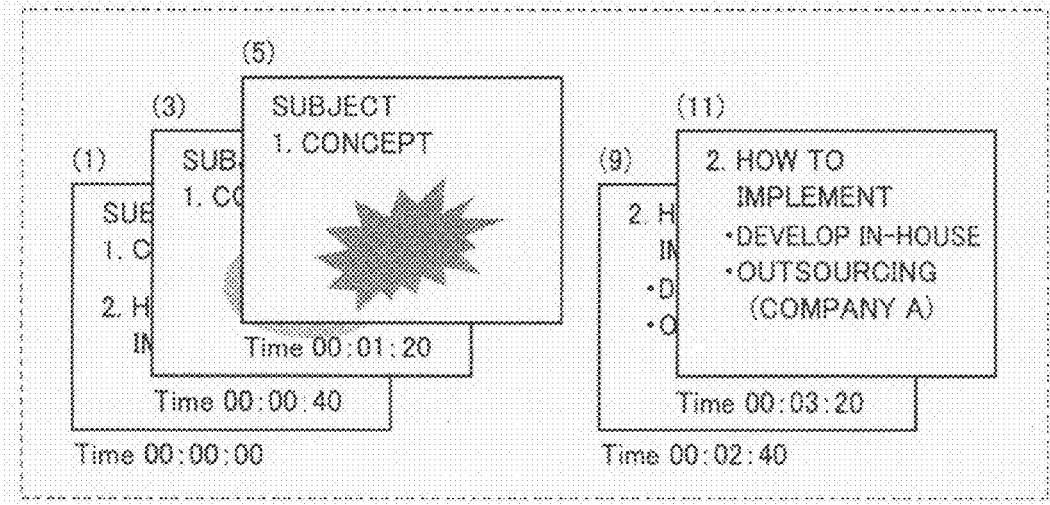
FIG. 7 shows a state in which the images in FIG. 6 are grouped.

FIG. 7 shows a state in which the images in FIG. 6 are grouped together.

The grouping is performed using a delimiting image as a boundary. Specifically, the images preceding a delimiting image are set as a group where the delimiting image is the last image in the group. Specifically, the images are managed in such a manner that they are divided into a group of images (1), (3) and (5) and a group of images (9) and (11).

Figure 8:
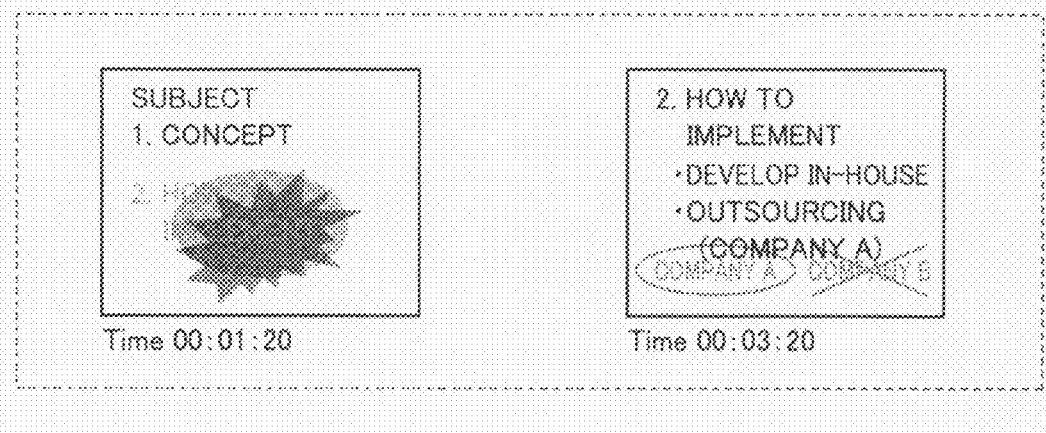
FIG. 8 shows an image obtained by overlapping the images of each group in FIG. 7 with each other.

FIG. 8 shows the images obtained by overlapping the images in each group in FIG. 7 with each other.

The images in each group appear on the display or are printed by MFP 600 in an overlapped manner. The images are overlapped with each other in such a manner that the image with the earliest Time Stamp is lightest and the latest image is darkest. Accordingly, the printing result as shown in FIG. 8 is obtained. More specifically, the image which is the last in the time series is displayed in a clearly distinguishable manner, and the older images are displayed more lightly.

Figure 9:
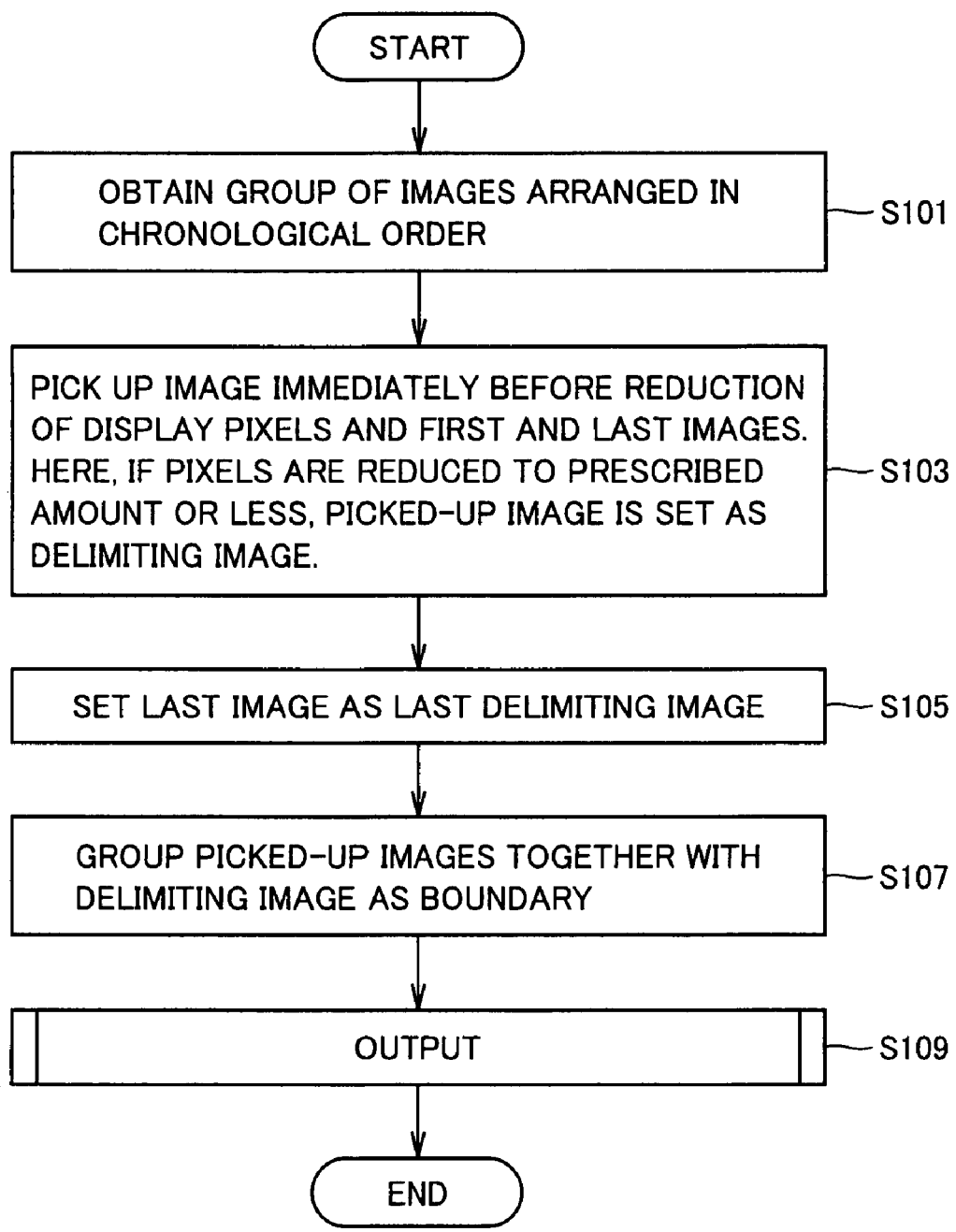
FIG. 9 is a flowchart illustrating a process executed by a meeting data conversion application.

FIG. 9 is a flowchart illustrating a process executed by the meeting data conversion application.

Referring to FIG. 9, at step S101, a group of images arranged in chronological order is obtained. At step S103, among the group of images arranged in chronological order, image data immediately before reduction of display pixels (image) and the first and last images in the image group are picked up. Here, if pixels are reduced to a prescribed amount or less, the meeting data conversion application specifies the picked up image as a delimiting image.

At step S105, the meeting data conversion application specifies the last image in the image group as the last delimiting image. At step S107, the meeting data conversion application groups the picked up images using the delimiting images as boundaries.

At step S109, the grouped images are output.

Figure 10:
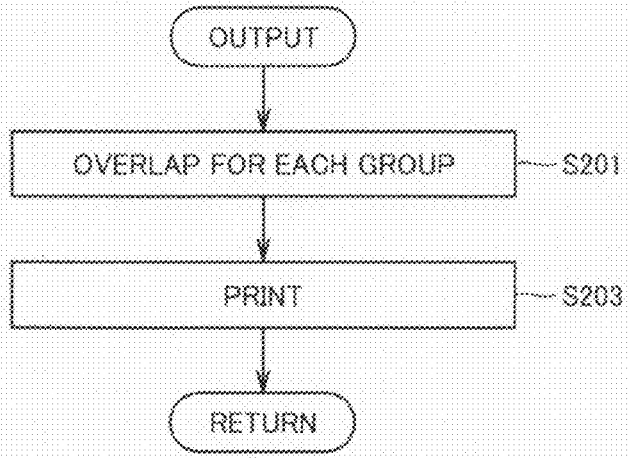
FIG. 10 is a flowchart illustrating the content of an output process at step S109 in FIG. 9.

FIG. 10 is a flowchart illustrating the content of the output process at step S109 in FIG. 9.

At step S201, images are overlapped with each other for each group. At step S203, the overlapped images are printed.

At the aforementioned step S101, the meeting data conversion application of the meeting system captures images displayed on PCs 1-3 or images displayed on electronic blackboard 655 at prescribed intervals (here, every 20 seconds) for storage into a storage device of PCs 1-3, MFP 600 or a server. In doing so, the meeting data conversion application generates and stores information for managing an image, for each of the captured images.

Figures 12, 13:
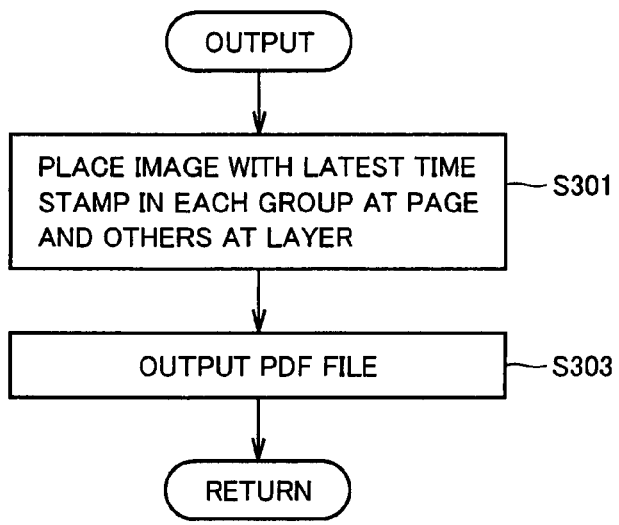
FIG. 12 is a flowchart illustrating the content of an image output process (step S109 in FIG. 9) in the second embodiment.
FIG. 13 shows a specific example of an image group management table.

FIG. 13 shows a specific example of information for managing the captured images. In the following description, the information shown in FIG. 13 will be referred to as an image group management table.

Referring to FIG. 13, the image group management table includes record meeting data corresponding to each of the captured images. Every time an image is captured, the conversion application generates a record corresponding to that image and adds the record to the end of the image group management table. Therefore, the number of records of the image group management table agrees with the number of the captured images. Stored in a record corresponding to one image are an image number, Time Stamp, an image file name, a PickUp flag, and a delimiting image flag. An image number is assigned to a record, which is incremented by one every time an image is captured. Time Stamp is a time interval from the start up to the point of time when an image is captured, where the time at which the meeting data conversion application starts capturing images is 00:00:00. An image is saved in a storage device, as a file in a format in which the image can be held, such as a JPEG format, and an image file name is the name indicating such a file. PickUp flag is a flag indicating whether the image is a picked-up image (on) or not (off). A delimiting image flag is a flag indicating whether the image is a delimiting image (on) or not (off). It is noted that the PickUp flag and the delimiting image flag are both off immediately after an image is captured.

Figure 14:
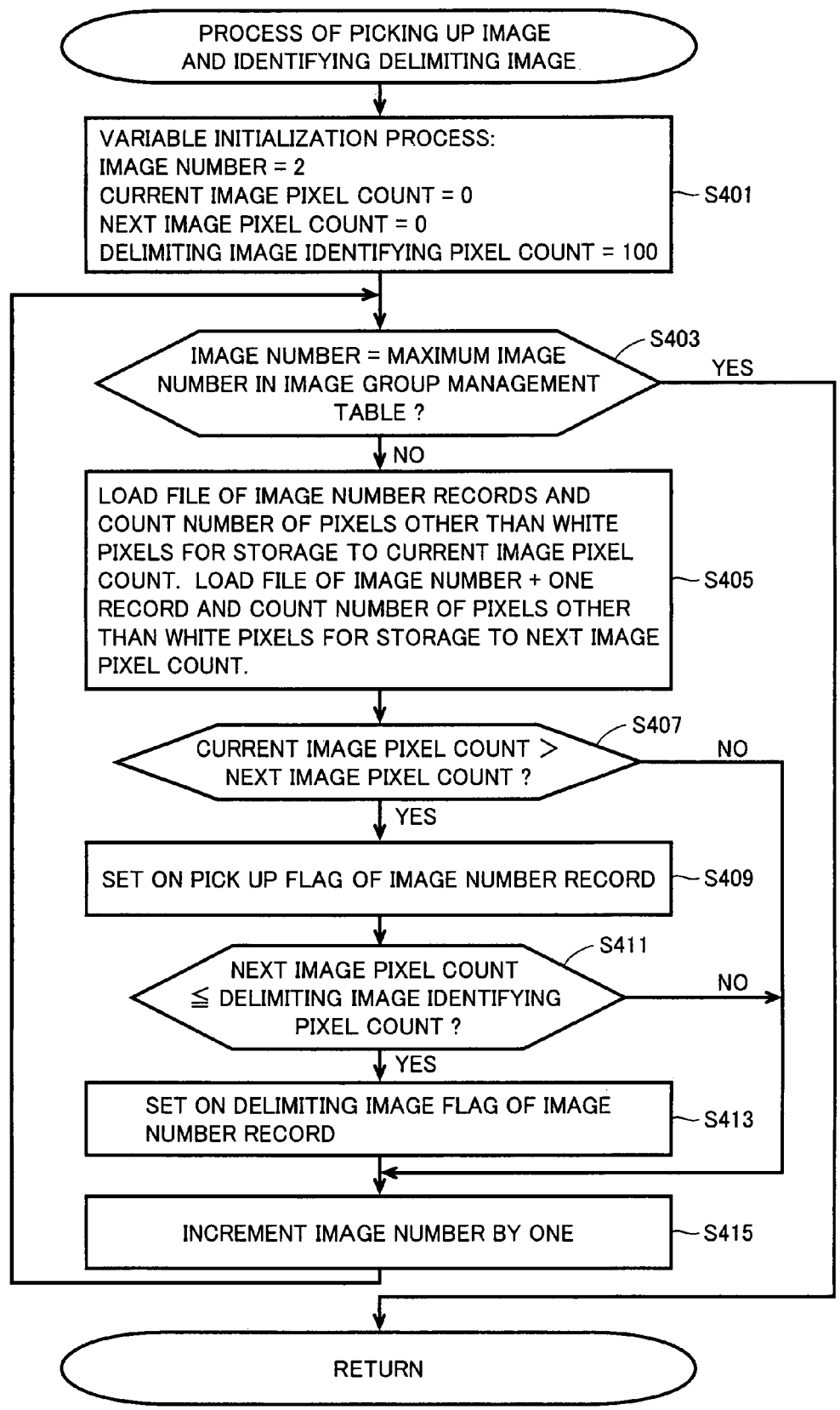
FIG. 14 is a flowchart illustrating the content of a process of picking up images and identifying a delimiting image.

FIG. 14 is a flowchart illustrating the content of a process of picking up images and identifying a delimiting image, at the aforementioned step S103.

Referring to FIG. 14, first, at step S401, a process of initializing variables is performed. The variables are "image number" referring to an image which is an image to be processed, "current image pixel count" indicating the number of pixels of the current image which is an image to be processed, "next image pixel count" indicating the number of pixels of the next image, and "delimiting image identifying pixel count" indicating the number of pixels which is a threshold value to determine whether the image is a delimiting image or not. Here, the variables are set to 2, 0, 0, 100, respectively, as initial values. Here, the initial value of "delimiting image identifying pixel count" among the aforementioned initial values is a numerical value held by the conversion application beforehand as an initial value and is the pixel count in which information effective for an image cannot be stored. Initial value 100 is a specific example thereof.

If the current "image number" does not reach the maximum value of the image numbers of the image group management table in FIG. 13 (NO at step S403), at step S405, an image corresponding to the current "image number" is read from a storage device, and the number of pixels other than white pixels is counted and stored in variable "current image pixel count." In addition, an image corresponding to the image number having the current "image number" plus one is read, and the number of pixels other than white pixels is counted and stored in variable "next image pixel count."

If "current image pixel count" is larger than "next image pixel count" (YES at step S407), at step S409, the PickUp flag of the record corresponding to the current image number in the image group management table is set on. In addition, if "next image pixel count" is equal to or smaller than "delimiting image identifying pixel count" (YES at step S411), at step S413, the delimiting image flag of the record corresponding to that image number in the image group management table is set on.

On the other hand, if "current image pixel count" is equal to or smaller than "next image pixel count" (NO at step S407), the aforementioned steps S409-S413 are skipped and the process goes to step S415. Even if "current image pixel count" is greater than "next image pixel count," if "next image pixel count" is greater than "delimiting image identifying pixel count" (No at step S411), similarly, step S413 is skipped and the process goes to step S415.

At step S415, the current "image number" is incremented by one. Then, the process returns to step S403 and the aforementioned process is repeated.

Then, by repeating steps S403-415, when the current "image number" reaches the maximum value of the image numbers in the image group management table in FIG. 13 (YES at step S403), a series of processes is ended and the process proceeds to step S105.

FIG. 15 shows a specific example of the image group management table when the aforementioned process is performed on the images in FIG. 5.

As a result of the comparison at the aforementioned step S407, images (3), (5) and (9) which are images immediately before reduction of pixels are picked up, and the PickUp flags of the images picked up at step S409 are set on. Therefore, referring to the figure, the PickUp flags of the records corresponding to the image numbers 3, 5 and 9 are set on. Here, since the first image and the last image are also picked up at the aforementioned step S103, referring to the figure, the PickUp flags of the records corresponding to the first image (1) and the last image (11) are also set on.

Furthermore, as a result of the comparison at the aforementioned step S411, among the images in FIG. 5, image (6) is identified as an image having pixels in use equal to or less than a prescribed amount (here, a pixel count 100), and image (5) is identified as the immediately preceding image, namely a delimiting image, so that the delimiting image flag of the identified image is set on at step S413. Therefore, referring to the figure, the delimiting image flag of the record corresponding to image number 5 is set on. Here, at the following step S105, the last image is also set as a delimiting image. Therefore, at the time when step S105 ends, in the image group management table, the delimiting image flag of the record corresponding to the last image (11) is also additionally set on, as shown in FIG. 16.

At the aforementioned step S107, the meeting data conversion application of the meeting system groups the images picked up in the process as described above. In doing so, the meeting data conversion application generates and stores information for managing a group, for each group. In the following description, the information for managing a group which is generated for each group will be referred to as a group table. A "group number" is assigned as identification information to a group having images grouped together. A group table is generated corresponding to a group number. In a record of the group table, an image number is stored as information indicating an image belonging to the group.

Figure 17:
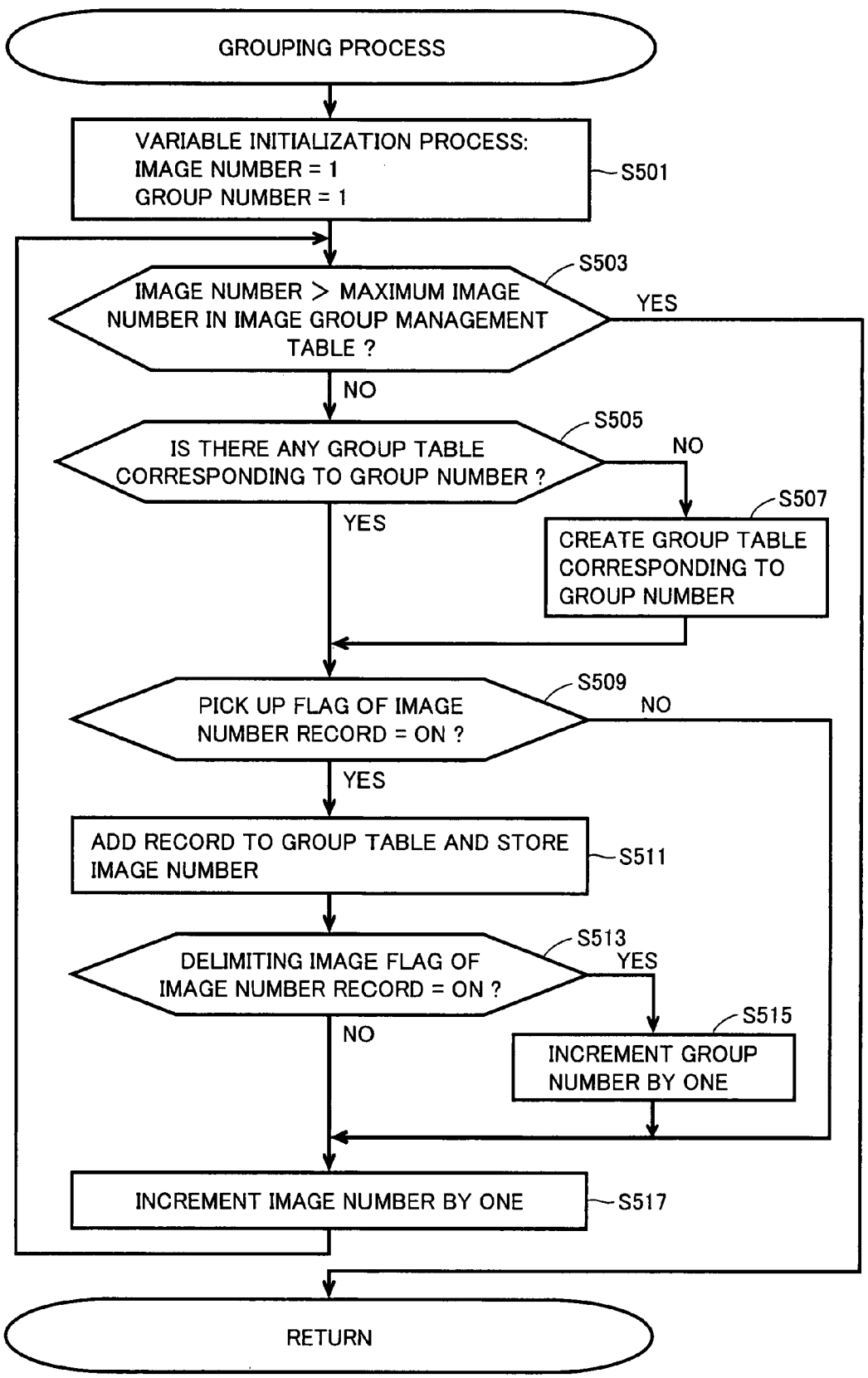
FIG. 17 is a flowchart illustrating the content of a process of grouping images picked up at step S107 in FIG. 9.

FIG. 17 is a flowchart illustrating the content of the process of grouping the picked-up image at step S107.

Referring to FIG. 17, first, at step S501, a process of initializing variables is performed. The variables are "image number" referring to an image which is an image to be processed, and "group number" indicating a group having images grouped together. Here, the variables are set to 1, 1, respectively, as initial values.

If the current "image number" does not reach the maximum value of the image numbers in the image group management table in FIG. 16 (No at step S503), when a group table corresponding to the current group number is not stored (No at step S505), a group table corresponding to that group number is generated (step S507).

Then, at step S509, it is confirmed whether the PickUp flag of the record corresponding to the current "image number" in the image group management table in FIG. 16 is on or not. If so (YES at step S509), a new record is added to the group table corresponding to the current group number, and the current "image number" is stored in that record (step S511). In addition, if the delimiting image flag of the record corresponding to the current "image number" in the image group management table in FIG. 16 is on (YES at step S513), the current "group number" is incremented by one (step S515). The current "image number" is incremented by one (step S517). The process then returns to step S503 and the aforementioned process is repeated. If the image flag is off (No at step S513), the current "group number" is kept as it is, and the current "image number" is incremented by one (step S517). The process then returns to step S503 and the aforementioned process is repeated. Furthermore, if the PickUp flag of the record corresponding to the current "image number" in the image group management table in FIG. 16 is off at the aforementioned step S509 (NO at step S509), the aforementioned steps S511-S515 are skipped, and the current "image number" is incremented by one (step S517). The process then returns to step S503 and the aforementioned process is repeated.

Then, by repeating steps S503-S517, when the current "image number" reaches the maximum value of the image numbers of the image group management table in FIG. 16 (YES at step S503), a series of processes is ended and the process proceeds to step S109.

FIG. 18A and FIG. 18B each show a specific example of two group tables generated as a result of performing the aforementioned process using the image group management table in FIG. 16.

Referring to FIG. 18A and FIG. 18B, as a result of performing the aforementioned process using the image group management table in FIG. 16, two group tables are generated, namely a group table corresponding to group number 1 (FIG. 18A) and a group table corresponding to group number 2 (FIG. 18B).

Specifically, until it is detected at the aforementioned step S513 that the delimiting image flag of the record corresponding to image number 5 in the image group management table is on, image numbers 1, 3, 5 are stored in the records of the group table (FIG. 18A) corresponding to group number 1, through the process at step S511. Next, until it is detected at the aforementioned step S513 that the delimiting image flag of the record corresponding to image number 11 in the image group management table is on, image numbers 9, 11 are stored in the records of the group table (FIG. 18B) corresponding to group number 2 generated at step S507, through the process at step S511.

Second Embodiment

The configuration of the meeting system in a second embodiment is the same as that of the first embodiment.

In the second embodiment, the meeting data conversion application outputs an image as a PDF® file rather than using a printer.

Figure 11:
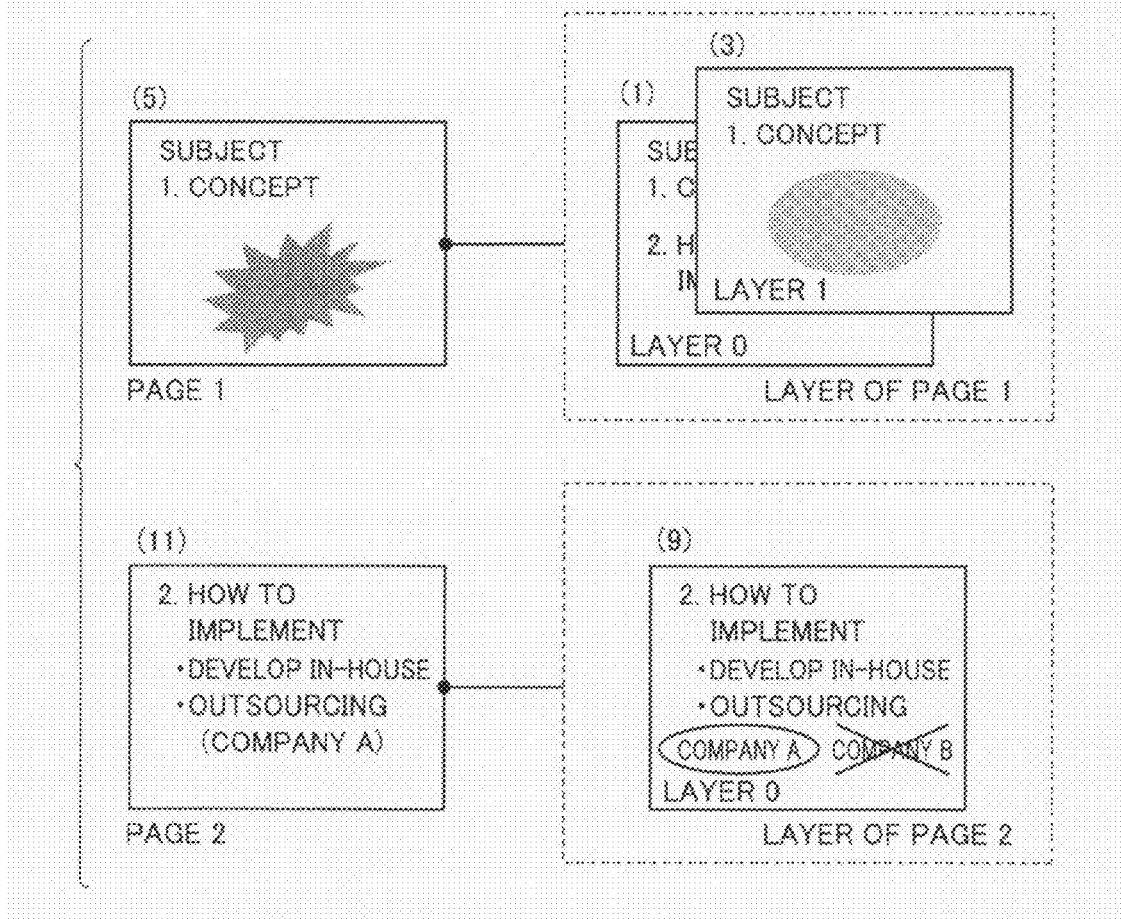
FIG. 11 shows an operation of the meeting data conversion application in a second embodiment.

FIG. 11 illustrates an operation of the meeting data conversion application in the second embodiment.

Here, a process of outputting the grouped images as in FIG. 7 will be described by way of example. The meeting data conversion application places images with the latest Time Stamp in each group at Page and the other images in the group at Layer of each page, in a PDF® file. For the details of a PDF® file having Layer, refer to "PDF® Reference fifth edition" (http://www.adobe.com/devnet/pdf/pdfs/PDFRefernece16.pdf) and "Create layered PDF® documents" (http://www.adobe.com/designcenter/acrobat/articles/arc7layer.html) issued by Adobe® Systems Incorporated.

Usually, the placement of image data in this manner allows only conclusion of each phase (image group) of a meeting to be displayed when this PDF® file is referred to by a PDF® display application. It becomes possible for a user to display the circumstances which lead to the conclusion, switching from one to another, using a Layer display operation. Here, in a PDF® file, the image with the earliest Time Stamp in each group may be placed at Page and the other images in the group may be placed at Layer of each page.

FIG. 12 is a flowchart illustrating the content of the process of outputting an image (step S109 in FIG. 9) in the second embodiment.

At step S301, the meeting data conversion application creates a PDF® file where the image with the latest Time Stamp in each group is placed at Page and the others are placed at Layer. At step S303, the PDF® file is output.

The process as described above allows information to be expressed in a small number of images without lacking included information from the images arranged in chronological order.

[Others]

Here, as a medium on which an image set in an image group is output as a still image, paper, an OHP sheet, electronic paper, and a PDF® file may be used.

It has been described that in a medium, a plurality of images which are output in an overlapped manner are arranged in order of time in such a manner that the first image is light and the last image is dark. However, images may simply be overlapped without changing the density.

The order in which images are arranged may be chronologically ascending order or descending order.

It is noted that the present invention may be carried out for an image formation apparatus such as MFP, facsimile machine, copier, and PC.

The process in the foregoing embodiments may be performed by software or using a hardware circuit.

It is also possible to provide a program executing the process in the foregoing embodiments or to provide a user with a recording medium such as CD-ROM, flexible disk, hard disk, ROM, RAM, and memory card having the program recorded thereon. The program may be downloaded to the apparatus via a communication line such as the Internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for processing all of a plurality of captured images arranged in chronological order, comprising the steps of:
   comparing two consecutive images in the plurality of captured images;
   determining whether the latter image of the consecutive images has a reduced amount of display content relative to the earlier image of the consecutive images and whether the reduction in the amount of display content meets a certain threshold,
   when the latter image has a reduced amount of display content relative to the earlier image, identifying the earlier image as a selected image;
   when the reduction in the amount of display content meets the certain threshold, identifying the earlier image as a delimiting image;
   displaying the selected images and the delimiting images.

2. The image processing method according to claim 1, further comprising the step of specifying as a selected image a first image of said plurality of captured images arranged in chronological order.

3. The image processing method according to claim 1, further comprising the step of specifying as a last delimiting image a last image of said plurality of captured images arranged in chronological order.

4. The image processing method according to claim 1, further comprising the step of processing one or more selected images from a selected image immediately after said delimiting image to a next delimiting image, as one image group.

5. The image processing method according to claim 4, further comprising the step of outputting said one or more selected images in said image group as a still image to a medium.

6. The image processing method according to claim 5, wherein said medium is at least one of paper and electronic paper.

7. The image processing method according to claim 5, wherein a plurality of said one or more selected images are output in an overlapped manner in said medium.

8. The image processing method according to claim 7, wherein said plurality of one or more selected images are arranged in order of time and overlapped in such a manner that a first image is lighter and a last image is darker.

9. The image processing method according to claim 8, wherein an order in which said plurality of one or more selected images are arranged is chronologically ascending order or descending order.

10. The image processing method according to claim 5, wherein
    a still image having a plurality of layers can be displayed in said medium, and
    the one or more selected images from a selected image immediately after said delimiting image to a next delimiting image are arranged in respective layers and output.

11. The image processing method according to claim 1, wherein said reduction of the amount of display content meeting the certain threshold includes the display content of the earlier image entirely disappearing in the latter image.

12. The image processing method according to claim 1, wherein said reduction of the amount of display content meeting the certain threshold includes the display content of the earlier image being reduced by at least half in the latter image.

13. The image processing method according to claim 1, wherein said reduction of the amount of display content meeting the certain threshold includes the latter image being indistinguishable in a medium on which the latter image is displayed.

14. The image processing method according to claim 1, wherein said reduction of the amount of display content meeting the certain threshold includes that a rectangular region including display content in the earlier image is reduced by at least half in the latter image.

15. A non-transient computer-readable recording medium having a program stored therein for processing all of a plurality of captured images arranged in chronological order, said program causing a computer to perform the following steps:
    comparing two consecutive images in the plurality of captured images;
    determining whether the latter image of the consecutive images has a reduced amount of display content relative to the earlier image of the consecutive images and whether the reduction in the amount of display content meets a certain threshold;
    when the latter image has a reduced amount of display content relative to the earlier image, identifying the earlier image as a selected image;
    when the reduction in the amount of display content meets the certain threshold, identifying the earlier image as a delimiting image; and
    displaying the selected images and the delimiting images.

16. The recording medium according to claim 15, said program further causing a computer to perform the step of identifying as a selected image a first image of said captured images arranged in chronological order.

17. The recording medium according to claim 15, said program further causing a computer to perform the step of identifying as a last delimiting image a last image of said plurality of captured images arranged in chronological order.

18. The recording medium according to claim 15, said program further causing a computer to perform the step of processing one or more selected images from a selected image immediately after said delimiting image to a next delimiting image, as one image group.

19. The recording medium according to claim 18, said program further causing a computer to perform the step of outputting said one or more selected images in said image group as a still image to a medium.

20. The program stored in the recording medium according to claim 19, wherein said medium is at least one of paper and electronic paper.

21. The program stored in the recording medium according to claim 19, wherein a plurality of said one or more selected images are output in an overlapped manner in said medium.

22. The program stored in the recording medium according to claim 21, wherein said plurality of said one or more selected images are arranged in order of time and overlapped in such a manner that a first image is lighter and a last image is darker.

23. The program stored in the recording medium according to claim 22, wherein an order in which said plurality of said one or more selected images are arranged is chronologically ascending order or descending order.

24. The program stored in the recording medium according to claim 19, wherein
a still image having a plurality of layers can be displayed in said medium, and the one or more selected images from a selected image immediately after said delimiting image to a next delimiting image are arranged in respective layers and output.

25. The program stored in the recording medium according to claim 15, wherein said reduction of the amount of display content meeting the certain threshold includes the display content of the earlier image entirely disappearing in the latter image.

26. The program stored in the recording medium according to claim 15, wherein said reduction of the amount of display content meeting the certain threshold includes the display content of the earlier image being reduced by at least half in the latter image.

27. The program stored in the recording medium according to claim 15, wherein said reduction of the amount of display content meeting the certain threshold includes the latter image being indistinguishable in a medium on which the latter image is displayed.

28. The program stored in the recording medium according to claim 15, wherein said reduction of the amount of display content meeting the certain threshold includes that a rectangular region including display content in the earlier image is reduced by at least half in the latter image.

29. An image processing apparatus adapted for processing all of a plurality of captured images arranged in chronological order, comprising a processor and a memory, the processor programmed to:
compare two consecutive images in the plurality of images,
determine whether the latter image of the consecutive images has a reduced amount of display content relative to the earlier image of the consecutive images and whether the reduction in the amount of display content meets a certain threshold,
when the latter image has a reduced amount of display content relative to the earlier image, identify the earlier image as a selected image,
when the reduction in the amount of display content meets the certain threshold, identify the earlier image as a delimiting image, and
display the selected images and the delimiting images.

* * * * *